United States Patent
Matsuda et al.

(10) Patent No.: US 12,253,717 B2
(45) Date of Patent: Mar. 18, 2025

(54) FIBER CUTTER AND FIBER CUTTING METHOD

(71) Applicants: FUJIKURA LTD., Tokyo (JP); NIPPON TELEGRAPH AND TELEPHONE CORPORATION, Tokyo (JP)

(72) Inventors: Takaharu Matsuda, Chiba (JP); Guan Huang, Chiba (JP); Ryo Koyama, Tokyo (JP); Masaaki Takaya, Tokyo (JP); Yoshiteru Abe, Tokyo (JP); Chisato Fukai, Tokyo (JP)

(73) Assignees: Fujikura Ltd., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 315 days.

(21) Appl. No.: 17/436,212

(22) PCT Filed: Mar. 3, 2020

(86) PCT No.: PCT/JP2020/008853
§ 371 (c)(1),
(2) Date: Sep. 3, 2021

(87) PCT Pub. No.: WO2020/184279
PCT Pub. Date: Sep. 17, 2020

(65) Prior Publication Data
US 2022/0128764 A1    Apr. 28, 2022

(30) Foreign Application Priority Data
Mar. 8, 2019    (JP) .................................. 2019-042169

(51) Int. Cl.
*G02B 6/25*    (2006.01)

(52) U.S. Cl.
CPC ...................................... *G02B 6/25* (2013.01)

(58) Field of Classification Search
CPC .................. G02B 6/25; Y10T 225/325; Y10T 225/321; Y10T 225/379; Y10T 225/386; Y10T 225/12

(Continued)

(56) References Cited

U.S. PATENT DOCUMENTS 3,934,773 A * 1/1976 Chinnock ............... C03B 33/14
225/5
4,473,942 A * 10/1984 Ridgway .................. G02B 6/25
225/2

(Continued)

FOREIGN PATENT DOCUMENTS

JP    S62-025902 U    2/1987
JP    S62-194204 A    8/1987

(Continued)

OTHER PUBLICATIONS

International Search Report and Written Opinion issued in corresponding International Application No. PCT/JP2020/008853, mailed on Jun. 9, 2020 (11 pages).

*Primary Examiner* — Evan H Macfarlane
(74) *Attorney, Agent, or Firm* — Osha Bergman Watanabe & Burton LLP

(57) ABSTRACT

A fiber cutter includes: a gripping member that grips an optical fiber; a blade that forms an initial cut in the optical fiber gripped by the gripping member; and a bending part that applies a predetermined bending stress to the optical fiber when the blade forms the initial cut in the optical fiber.

6 Claims, 10 Drawing Sheets

(58) Field of Classification Search
USPC .............................. 225/2, 96, 96.5, 104, 105
See application file for complete search history.

(56) References Cited

U.S. PATENT DOCUMENTS

| | | | | |
|---|---|---|---|---|
| 4,503,744 A | * | 3/1985 | Garner | G02B 6/25 83/881 |
| 4,552,290 A | * | 11/1985 | Szostak | G02B 6/25 225/101 |
| 4,683,792 A | * | 8/1987 | Demont | B29C 44/56 83/16 |
| 5,312,468 A | * | 5/1994 | Yin | G02B 6/25 225/2 |
| 5,829,659 A | * | 11/1998 | Mansfield | G02B 6/25 225/5 |
| 6,337,943 B1 | * | 1/2002 | Dumitriu | G02B 6/25 225/2 |
| 2002/0113108 A1 | * | 8/2002 | Jackson | B65H 35/02 225/2 |
| 2003/0123836 A1 | * | 7/2003 | Fujisawa | G02B 6/2556 385/137 |
| 2008/0245836 A1 | | 10/2008 | Murgatroyd | |
| 2011/0084108 A1 | * | 4/2011 | McClintock | B26F 3/002 225/2 |
| 2014/0299645 A1 | * | 10/2014 | Lurie | G02B 6/25 225/96 |
| 2018/0334406 A1 | * | 11/2018 | Kawanishi | C03B 37/16 |
| 2020/0326486 A1 | * | 10/2020 | Lower | G02B 6/25 |

FOREIGN PATENT DOCUMENTS

| | | |
|---|---|---|
| JP | H01-213604 A | 8/1989 |
| JP | 2002-515141 | 5/2002 |
| JP | 2012-168260 A | 9/2012 |
| JP | 2014-071284 A | 4/2014 |
| JP | 2014-238574 A | 12/2014 |
| JP | 2018-194598 A | 12/2018 |

* cited by examiner

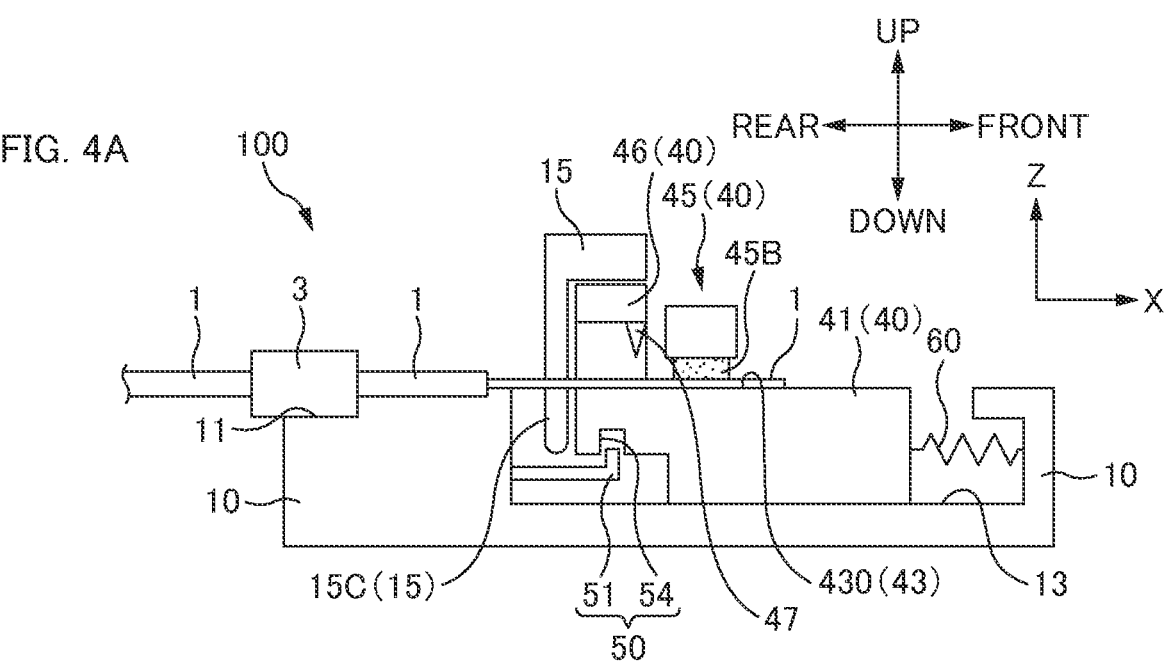
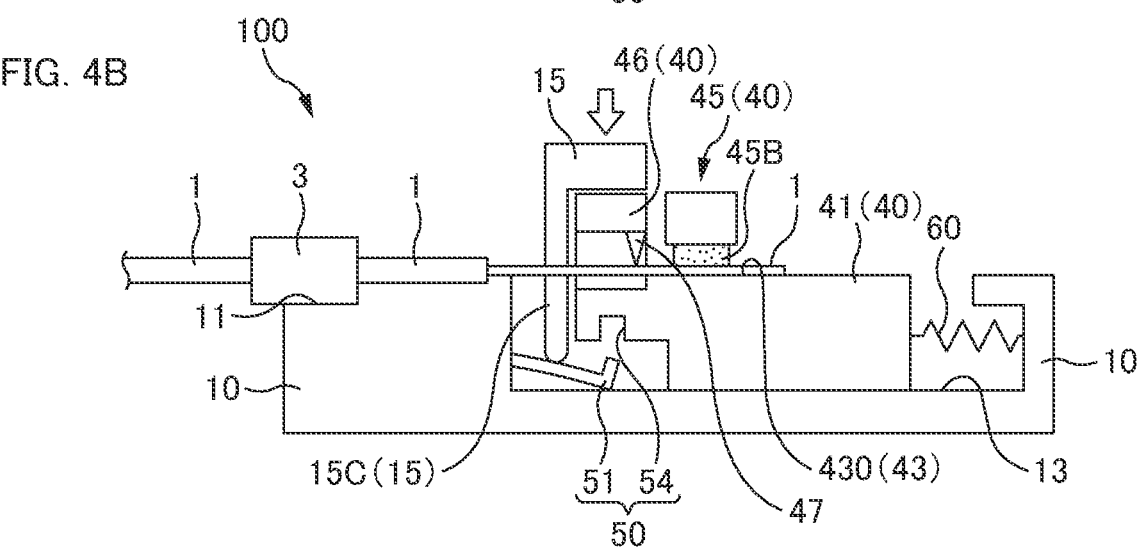
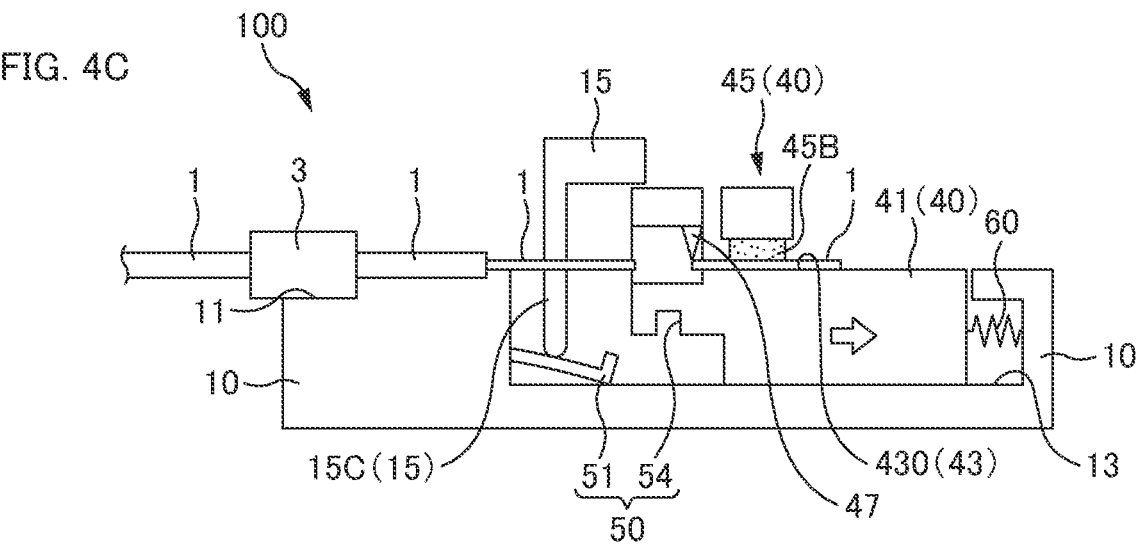

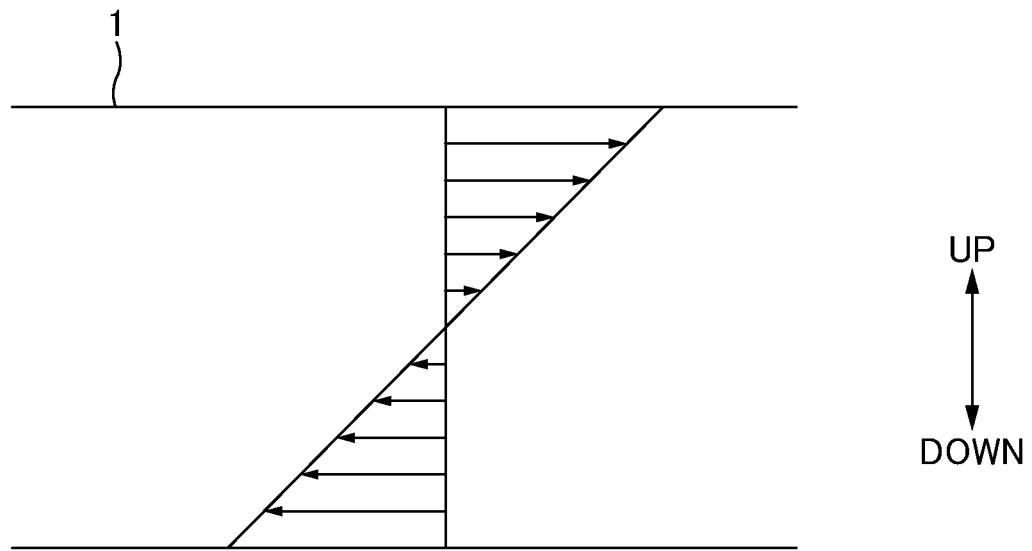
FIG. 7A (STRESS DISTRIBUTION IN POSITION A)
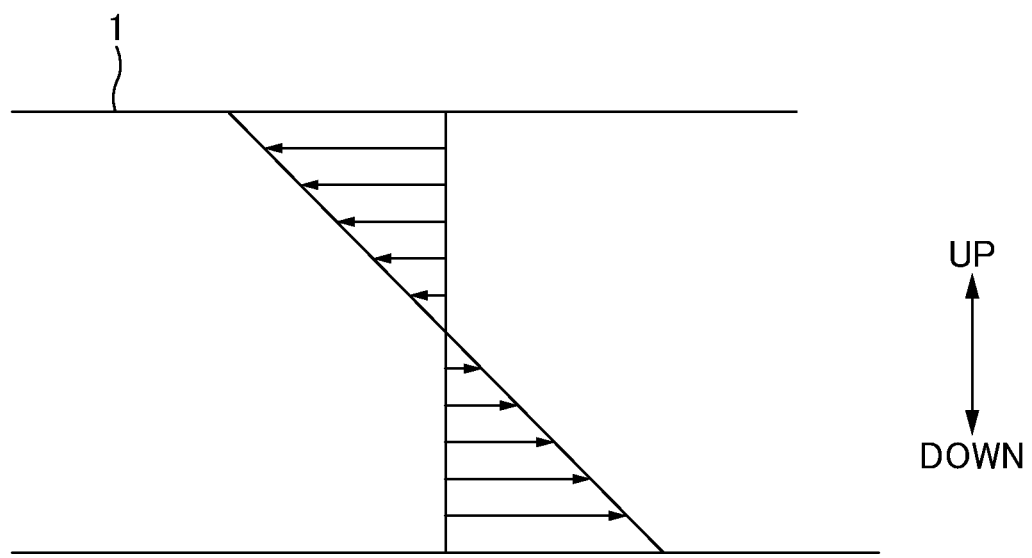
FIG. 7B (STRESS DISTRIBUTION IN POSITION B)

(STRESS DISTRIBUTION IN POSITION A AFTER LATCH RELEASE)

(STRESS DISTRIBUTION IN POSITION B AFTER LATCH RELEASE)

FIBER CUTTER AND FIBER CUTTING METHOD

BACKGROUND

Technical Field

The present invention relates to a fiber cutter and a fiber cutting method.

Description of Related Art

In general, a fiber cutter that cuts an optical fiber forms an initial cut in the optical fiber with a blade, grows the initial cut to cleave the optical fiber, and thus cuts the optical fiber (refer to Patent Literatures 1 to 3, for example).

PATENT LITERATURES

Patent Literature 1: S 62-194204A
Patent Literature 2: JP 2014-238574A
Patent Literature 3: JP 2018-194598A By forming an initial cut in an optical fiber while applying torsional stress and bending stress to the optical fiber, a cut surface (cleavage surface) of the optical fiber may be inclined. However, when stress (torsional stress and bending stress) applied to the optical fiber is unstable, a predetermined inclination end face cannot be acquired. For example, when a blade for forming an initial cut in the optical fiber is galled, stress applied to the optical fiber during formation of the initial cut changes, and an angle of an inclination end face of the optical fiber may change.

SUMMARY

One or more embodiments of the present invention can cut an optical fiber such that a cut surface is inclined at a predetermined angle.

A fiber cutter of one or more embodiments comprises: a gripping member (i.e., gripping tool) configured to grip an optical fiber; a blade configured to form an initial cut in the optical fiber gripped by the gripping member; and a bending part (i.e., support plate) configured to apply predetermined bending stress to the optical fiber when the blade forms the initial cut in the optical fiber.

Other features of one or more embodiments are made clear by the following description and the drawings.

With one or more embodiments of the present invention, it is possible to cut an optical fiber such that a cut surface is inclined at a predetermined angle.

BRIEF DESCRIPTION OF DRAWINGS

FIGS. 4A to 4C are schematic explanatory diagrams of the fiber cutter 100.
FIG. 7A is an explanatory diagram of stress distribution of an optical fiber 1 in a position A.
FIG. 7B is an explanatory diagram of stress distribution of the optical fiber 1 in a position B.

DETAILED DESCRIPTION OF EMBODIMENTS

At least the following matters are made clear from the following description and the drawings.

A fiber cutter will become clear comprising: a gripping member (i.e., gripping tool) configured to grip an optical fiber; a blade configured to form an initial cut in the optical fiber gripped by the gripping member; and a bending part (i.e., support plate) configured to apply predetermined bending stress to the optical fiber when the blade forms the initial cut in the optical fiber. With such a fiber cutter, it is possible to cut the optical fiber such that a cut surface is inclined at a predetermined angle.

In one or more embodiments, the gripping member includes a clamp part (i.e., clamp) configured to press the optical fiber against a placement surface of the fiber cutter on which the optical fiber is placed, and the bending part supports the optical fiber at a higher position than the placement surface. In this way, when the optical fiber is gripped by the gripping member, the bending part can bend the optical fiber, and thus it is possible to apply, to the optical fiber, predetermined bending stress in accordance with a positional relationship between the gripping member and the bending part.

In one or more embodiments, the bending part is fixed with respect to the placement surface. In this way, it is easier to maintain bending stress applied to the optical fiber to be constant.

In one or more embodiments, the bending part includes a recess (i.e., V-shaped recess) having a V shape, and a bottom of the recess is configured to support the optical fiber. In this way, the optical fiber is less likely to be detached from the bending part.

In one or more embodiments, the bending part applies a force to the optical fiber from one side to an opposite side on which the blade forms the initial cut. In this way, it is possible to acquire a clean cut surface.

In one or more embodiments, the bending part applies the predetermined bending stress to the optical fiber and causes a section of the optical fiber to protrude, and the blade forms the initial cut at the protruded section. In this way, it is possible to acquire a clean cut surface.

A fiber cutting method will become clear comprising: gripping an optical fiber while applying a predetermined bending stress to the optical fiber; and cutting the optical fiber such that a cut surface is inclined with respect to a surface perpendicular to an optical axis of the optical fiber, by forming an initial cut in the optical fiber while applying the predetermined bending stress to the optical fiber. With such a fiber cutting method, it is possible to cut the optical fiber such that a cut surface is inclined at a predetermined angle.

First Embodiment

Overall Structure

Figure 1:
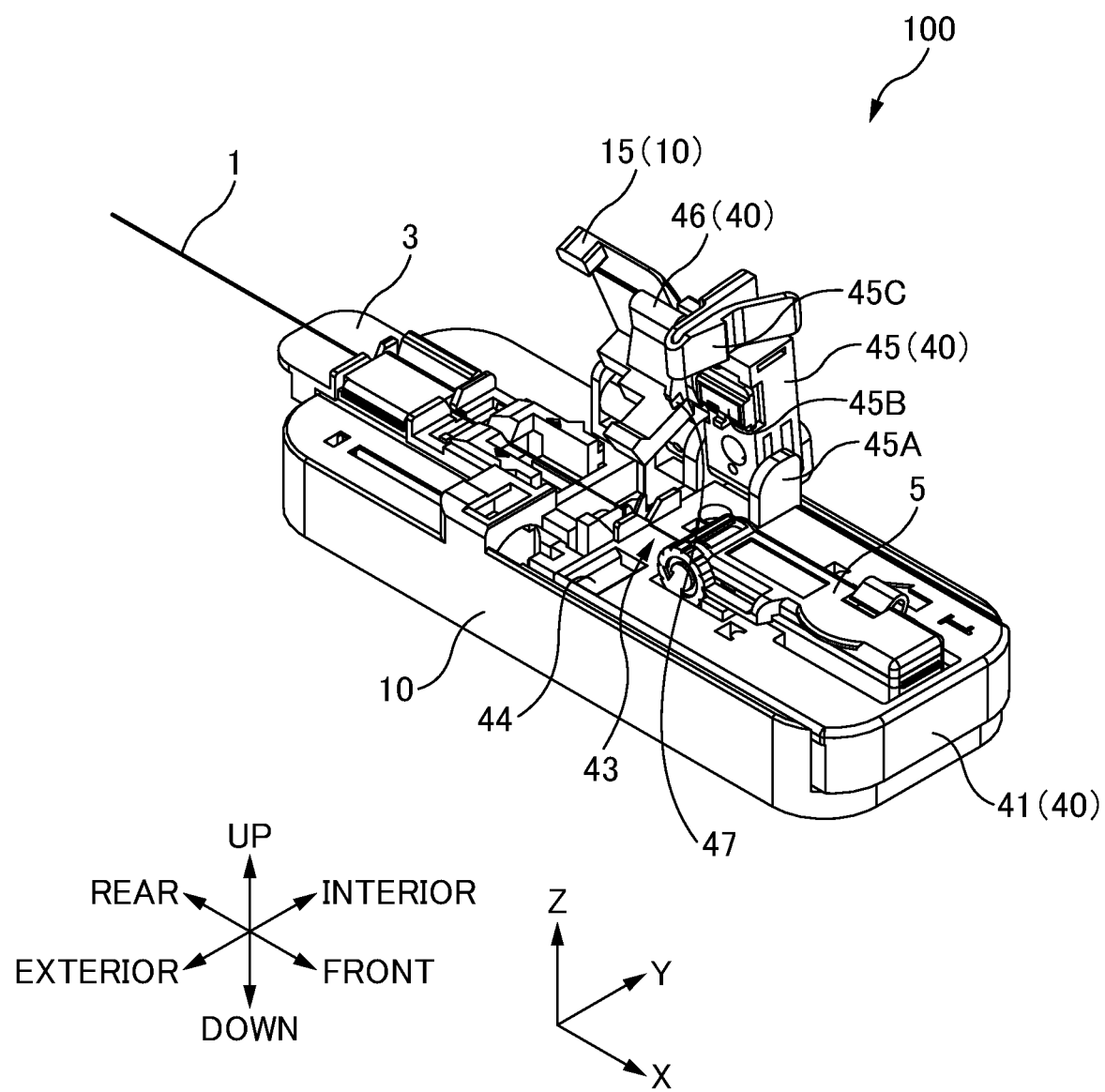
FIG. 1 is a perspective view of a fiber cutter 100.
Figure 2:
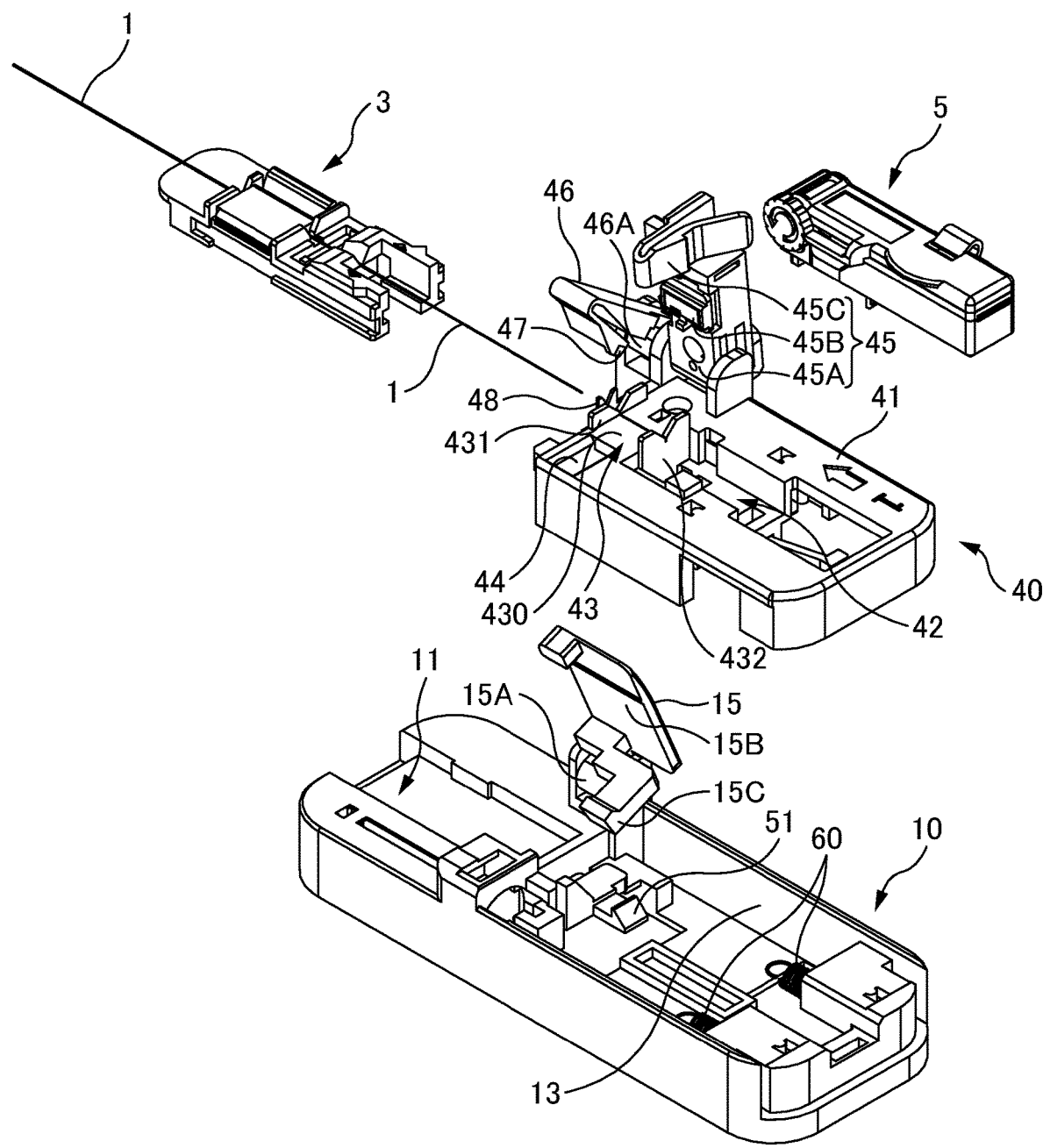
FIG. 2 is an exploded perspective view of the fiber cutter 100.
Figure 3A:
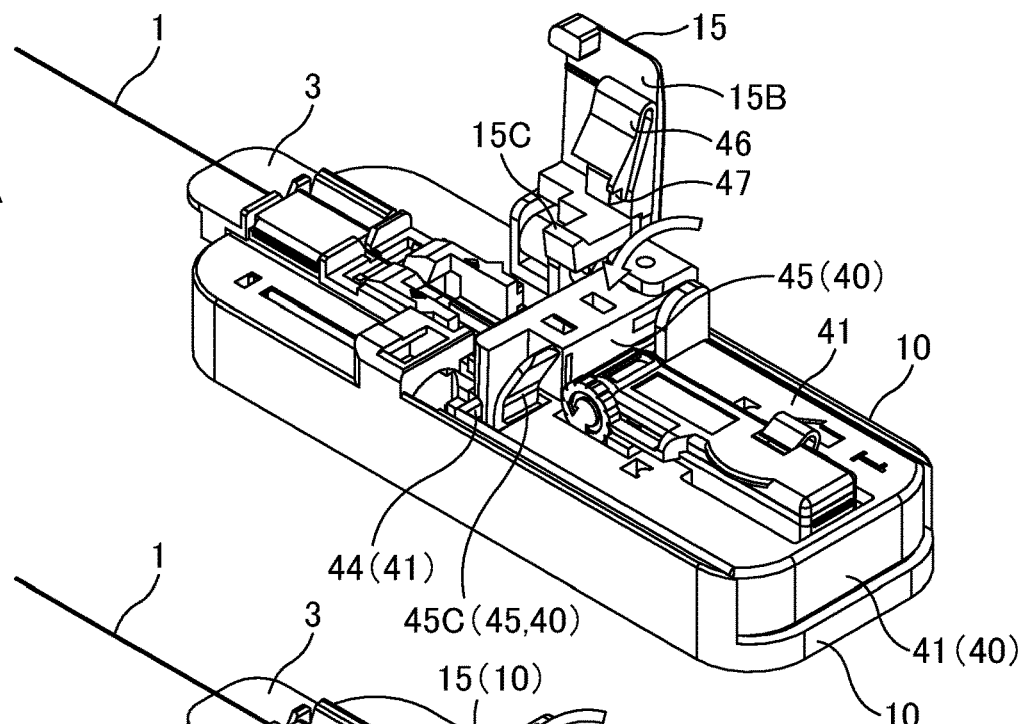
FIGS. 3A to 3C are operation explanatory diagrams of the fiber cutter 100.
Figure 3B:
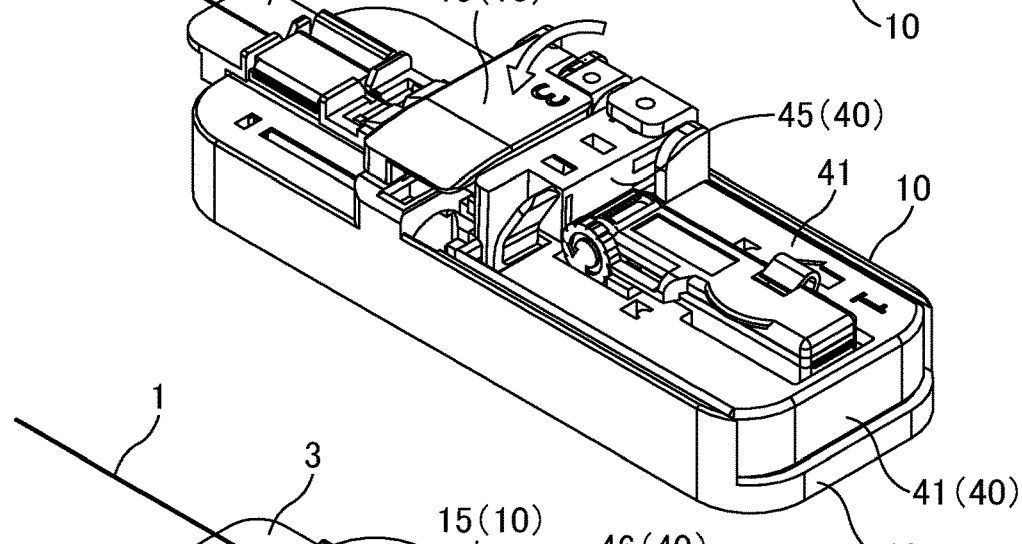
Figure 3C:
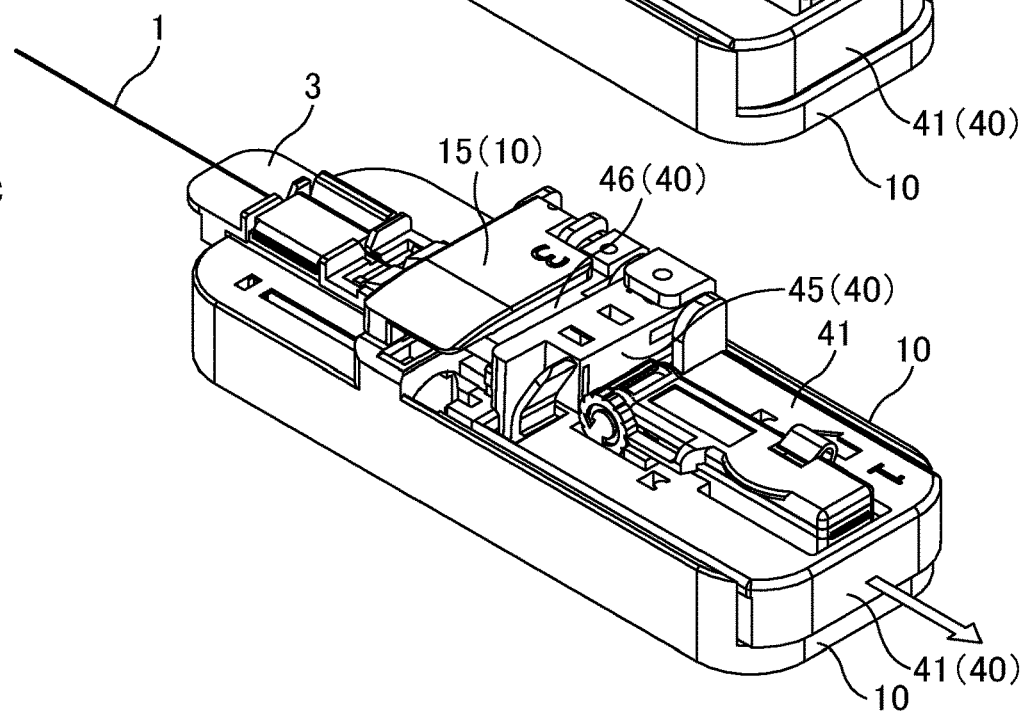

FIG. 1 is a perspective view of a fiber cutter 100. FIG. 2 is an exploded perspective view of the fiber cutter 100. FIGS. 3A to 3C are operation explanatory diagrams of the fiber cutter 100. FIGS. 4A to 4C are schematic explanatory diagrams of the fiber cutter 100.

In the following description, directions will be defined as illustrated in FIG. 1. Specifically, a direction parallel to a movement direction of a moving member 40 is defined as an "X-axis direction" or a "front-rear direction" of a base member described later, a side to which the moving member 40 moves immediately after a cut of an optical fiber 1 is defined as a "+X direction" or "front", and an opposite side (side of a holder 3 when viewed from the moving member 40) is defined as a "−X direction" or "rear". A direction perpendicular to a placement surface 430 on which an end part of the optical fiber 1 is placed is defined as a "Z-axis direction" or an "up-down direction", a side on which the optical fiber 1 is placed when viewed from the placement surface 430 is defined as a "+Z direction" or "up", and an opposite side is defined as a "−Z direction" or "down". A direction perpendicular to the X-axis direction (front-rear direction) and the Z-axis direction (up-down direction) is defined as a Y-axis direction, a side of a rotary part 45A when viewed from the optical fiber 1 is defined as a "+Y direction" or "interior", and an opposite side is defined as a "−Y direction" or "exterior".

The fiber cutter 100 is a cutting device that cuts the optical fiber 1. The fiber cutter 100 is a device that forms an initial cut in the optical fiber 1 with a blade 47, grows the initial cut to cleave the optical fiber 1, and thus cuts the optical fiber 1.

The fiber cutter 100 includes a base member 10 and the moving member 40. The fiber cutter 100 includes a latch 50 and a tension application spring 60.

The base member 10 includes a holder placement part 11, a guide 13, and an operation device 15. The holder placement part 11 is a part on which the holder 3 that holds the optical fiber 1 is placed. The holder placement part 11 is arranged on the rear side of the base member 10. The guide 13 is a part that guides the moving member 40 such that the moving member 40 can move in the front-rear direction. The guide 13 is formed on the front side of the base member 10.

The operation device 15 is a device which is operated by an operator. The operation device 15 is configured to open and close (rotatably) with respect to a body of the base member 10. The operator operates the operation device 15 to bring the blade 47 close to the optical fiber 1 for forming an initial cut in the optical fiber 1.

The operation device 15 includes a rotary part 15A, a housing part 15B, and a latch release part 15C. The rotary part 15A is a coupling part that rotatably couples the operation device 15 to the base member 10. The housing part 15B is a part that houses a cut formation part 46 therein. The housing part 15B houses the cut formation part 46 such that the cut formation part 46 can move in the front-rear direction with respect to the operation device 15. An inner wall surface (counter surface that faces an upper surface of the cut formation part 46) of the housing part 15B is a part that presses the cut formation part 46. The latch release part 15C is a part that releases a latch state of the latch 50. When the operator rotates the operation device 15 in a closing direction, the latch release part 15C releases the latch state of the latch 50.

The moving member 40 is a movable member with respect to the base member 10. The moving member 40 moves to the front side after cutting the optical fiber 1 immediately (refer to FIGS. 3C and 4C). The moving member 40 includes a moving body 41, a gripping member or gripping tool 45, and the cut formation part 46. The moving member 40 according to the present embodiment includes a bending part or support plate 48.

The moving body 41 is a member constituting a body of the moving member 40. The moving body 41 is movable in the front-rear direction while being guided by the guide 13 of the base member 10. An end part of the tension application spring 60 is coupled to the moving body 41, and the moving body 41 moves with respect to the base member 10 by a force of the tension application spring 60. The gripping member 45 and the cut formation part 46 are rotatably located independently of each other with respect to the moving body 41. The moving body 41 includes a case housing part 42 and a placement region 43. The case housing part 42 is a part that houses a waste case 5. The waste case 5 is a case that houses a cut end part of the optical fiber 1.

The placement region 43 is a region on which an end part of the optical fiber 1 is placed. The placement region 43 is a region including a holding part that holds an end part of the optical fiber 1 with using the gripping member 45. The placement region 43 includes the placement surface 430, a first guide part 431, and a second guide part 432.

The placement surface 430 is a surface on which an end part of the optical fiber 1 is placed. A V groove is formed in the placement surface 430, and the optical fiber 1 is placed on the V groove. However, the V groove may not be formed in the placement surface 430 (the placement surface 430 may be formed by a flat surface). The optical fiber 1 is held by being sandwiched between the placement surface 430 (specifically, the V groove) and the gripping member 45 (specifically, a clamp part or clamp 45B). The placement surface 430 is a surface parallel to an XY plane (a surface perpendicular to the Z-axis direction). The V groove is a V-shaped groove parallel to the X-axis direction. The first guide part 431 and the second guide part 432 are located so as to sandwich the V groove of the placement surface 430 from the front-rear direction. In other words, the placement surface 430 (V groove) is formed between the first guide part 431 and the second guide part 432.

The first guide part 431 and the second guide part 432 are parts that guide the optical fiber 1 to a predetermined position (here, the V groove). The first guide part 431 and the second guide part 432 each guide the optical fiber 1 to the predetermined position in the Y-axis direction. Here, the first guide part 431 and the second guide part 432 are each a V-shaped recess (notch part). The first guide part 431 and the second guide part 432 are arranged so as to be aligned in the front-rear direction. The first guide part 431 is located closer to the rear side than the placement surface 430, and the second guide part 432 is located closer to the front side than placement surface 430. A position in the Y-axis direction of a bottom (top) of the first guide part 431 and the second guide part 432 having a V shape is aligned with a position in the Y-axis direction of the V groove of the placement surface 430. The first guide part 431 and the second guide part 432 guide the optical fiber 1, and thus the optical fiber 1 can be placed on the placement surface 430 in parallel with the X-axis direction (front-rear direction). The first guide part 431 and the second guide part 432 guide the optical fiber 1, and thus the optical fiber 1 can be placed on the V groove of the placement surface 430. Note that the placement region 43 (placement surface 430) may be formed without arranging the first guide part 431 and the second guide part 432.

In the present embodiment, the first guide part 431 (and the second guide part 432) is formed in a V shape, and has a shape open on the upper side. Thus, the optical fiber 1 arranged on the first guide part 431 is allowed to be displaced upward.

The gripping member 45 is a member that grips an end part of the optical fiber 1. The gripping member 45 is configured to open and close (rotatably) with respect to the moving body 41. The gripping member 45 is located closer to the front side than the blade 47. Thus, the gripping member 45 grips the optical fiber 1 on the front side with respect to a cut position of the optical fiber 1. The gripping member 45 includes a rotary part 45A, the clamp part 45B, and a locking part 45C. The rotary part 45A is a coupling part that rotatably couples the gripping member 45 to the moving body 41. The clamp part 45B is a part that comes into contact with an end part of the optical fiber 1 placed on the placement region 43 (specifically, the placement surface 430), and presses the optical fiber 1 against the placement surface 430. In other words, the optical fiber 1 is sandwiched between the placement surface 430 and the clamp part 45B from the up-down direction. The locking part 45C is a part that is to be locked into an engagement hole 44 of the moving body 41, and is a part that fixes the gripping member 45 in a closed state. The locking part 45C is locked into the engagement hole 44 of the moving body 41, and fixes the gripping member 45 in the closed state, and thus the optical fiber 1 is held between the placement surface 430 and the clamp part 45B.

In the present embodiment, when the gripping member 45 grips the optical fiber 1, the bending part 48 applies bending stress to the optical fiber 1. A configuration and a function of the bending part 48 will be described later.

The cut formation part 46 is a part that forms an initial cut in the optical fiber 1. The cut formation part 46 is configured to open and close (rotatably) with respect to the moving body 41. The cut formation part 46 includes a rotary part 46A and the blade 47. The rotary part 46A is a coupling part that rotatably couples the cut formation part 46 to the moving body 41. The blade 47 is a member (blade) that forms an initial cut in the optical fiber 1. The upper surface of the cut formation part 46 is a part to be pressed by the inner wall surface of the housing part 15B of the operation device 15. When the operator rotates the operation device 15 in the closing direction, the cut formation part 46 is pressed by the inner wall surface of the housing part 15B in the closing direction, and the cut formation part 46 also rotates in the closing direction. As a result, the blade 47 of the cut formation part 46 forms an initial cut in the optical fiber 1.

The latch 50 is a system that is configured to latch the base member 10 and the moving member 40. The latch 50 includes a base-side latch part 51 and a moving-side latch part 54. The base-side latch part 51 is a cantilever section located on the base member 10. The base-side latch part 51 comes into contact with the latch release part 15C of the operation device 15, and is elastically deformed. In this way, the base-side latch part 51 is detached from the moving-side latch part 54 to release the latch state. The moving-side latch part 54 is a part located on the moving member 40, and is a part that fastens an end part of the base-side latch part 51.

The tension application spring 60 is a member (tension application part) that applies a force between the base member 10 and the moving member 40. The tension application spring 60 is arranged between the base member 10 and the moving member 40. One end (front end) of the tension application spring 60 is coupled to the base member 10, and the other end is coupled to the moving member 40. When the latch 50 is in the latch state (when the base-side latch part 51 and the moving-side latch part 54 are in the latch state), a tensile force is applied to the tension application spring 60.

Next, a basic operation of the fiber cutter 100 when cutting the optical fiber 1 will be described.

When the latch 50 is in a release state, the operator moves the moving member 40 to the rear side (side of the holder 3) and brings the latch 50 into the latch state. When the latch 50 is in the latch state, the base member 10 and the moving member 40 are fixed with a tensile force being applied to the tension application spring 60. When the latch 50 is in the latch state, the cut formation part 46 is in a state of being housed inside the housing part 15B of the operation device 15 (the inner wall surface of the housing part 15B and the upper surface of the cut formation part 46 are in a state of facing each other).

The operator sets the holder 3 on the holder placement part 11 of the base member 10. The optical fiber 1 to be cut is held in the holder 3. The optical fiber 1 extends from the front side of the holder 3, and an end part of the optical fiber 1 is removed of a sheath in advance. The operator arranges the optical fiber 1 on the V groove of the placement surface 430 while guiding the optical fiber 1 with the first guide part 431 and the second guide part 432. The operator inserts the end part of the optical fiber 1 into the waste case 5. In this way, when the operator sets the holder 3 on the holder placement part 11, the optical fiber 1 is in a state of spanning from the holder 3 to the waste case 5.

Next, as illustrated in FIGS. 3A and 4A, the operator closes the gripping member 45, and sandwiches the optical fiber 1 between the placement surface 430 (specifically, the V groove) and the gripping member 45 (specifically, the clamp part 45B), and thus the optical fiber 1 is gripped. Note that the operator closes the gripping member 45 until the locking part 45C of the gripping member 45 is locked into the engagement hole 44 of the moving body 41, and fixes the gripping member 45 in the closed state, and thus the optical fiber 1 is held between the placement surface 430 and the clamp part 45B. Note that, at this time, in the present embodiment, the bending part 48 applies bending stress to the optical fiber 1 (described later).

After the gripping member 45 grips the optical fiber 1, as illustrated in FIGS. 3B and 4B, the operator closes the operation device 15 (and the cut formation part 46). When the operation device 15 is rotated in the closing direction, the cut formation part 46 also rotates in the closing direction together with the operation device 15, and the blade 47 of the cut formation part 46 moves in a direction closer to the optical fiber 1.

As illustrated in FIG. 4B, when the operation device 15 is rotated in the closing direction, the latch release part 15C of the operation device 15 comes into contact with the base-side latch part 51. When the operation device 15 is further rotated in the closing direction, the base-side latch part 51 is detached from the moving-side latch part 54 to release the latch state. When the latch state is released, a force of the tension application spring 60 is applied between the base member 10 and the moving member 40, and thus tension is applied to the optical fiber 1. Note that the moving member 40 does not move in this phase of pre-cutting the optical fiber 1 because tension acts on the optical fiber 1 in the phase.

When the latch state is released, and then the operation device 15 is further rotated in the closing direction, the blade 47 of the cut formation part 46 comes into contact with the optical fiber 1, and an initial cut is formed in the optical fiber 1. When the initial cut is formed in the optical fiber 1 with tension being applied, the initial cut grows, and the optical fiber 1 is cleaved, and thereby the optical fiber 1 is cut. When the optical fiber 1 is cut, as illustrated in FIGS. 3C and 4C, the moving member 40 moves to the front side by a force of the tension application spring 60. Note that, since bending stress is applied to the optical fiber 1 in the present embodiment, a cut surface (cleavage surface) of the optical fiber 1 is inclined with respect to a surface perpendicular to an optical axis of the optical fiber 1 (described later).

With Regard to Bending Part 48

Figure 5:
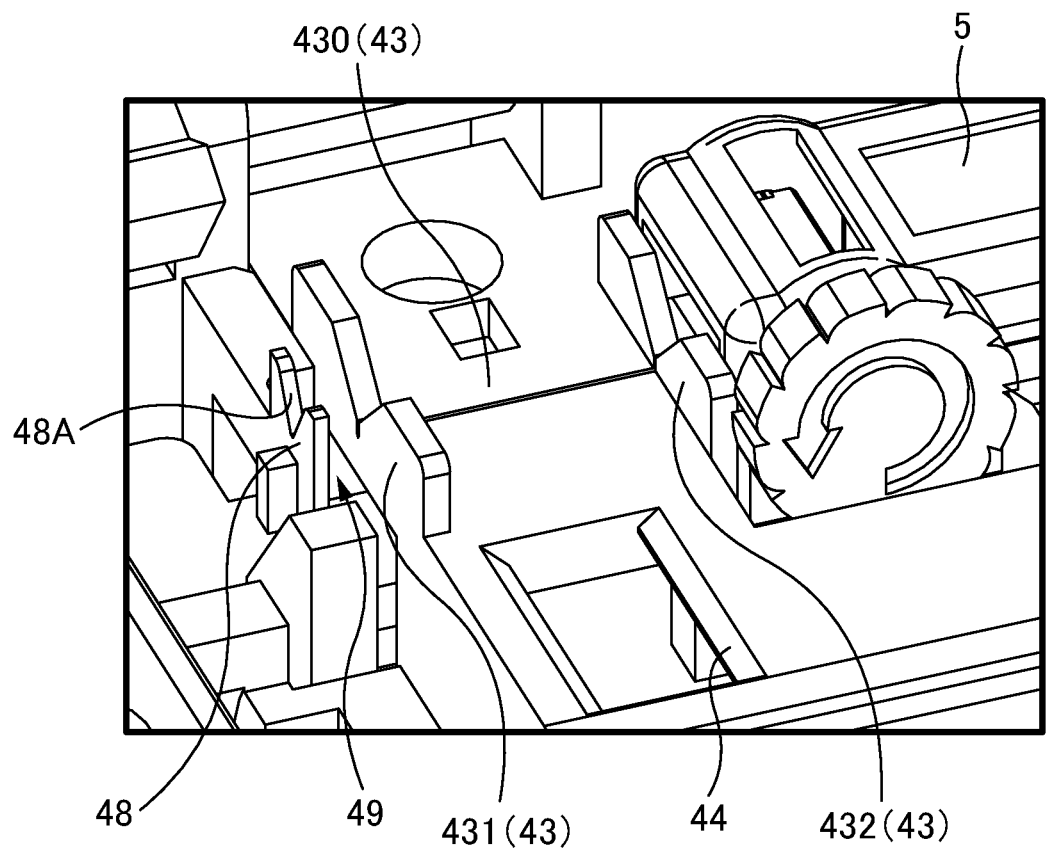
FIG. 5 is a perspective view of the vicinity of a bending part 48.
Figure 6A:
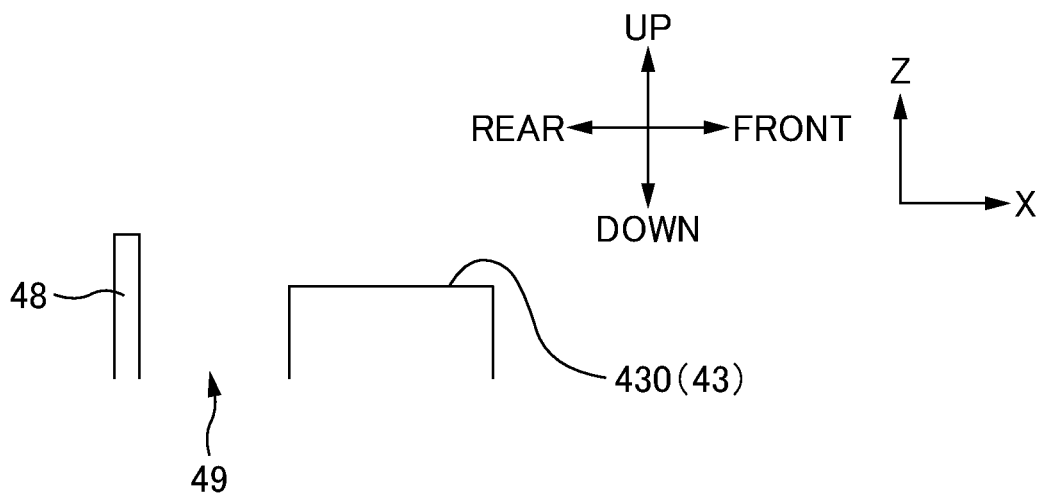
FIGS. 6A to 6C are schematic explanatory diagrams of the vicinity of the bending part 48.
Figure 6B:
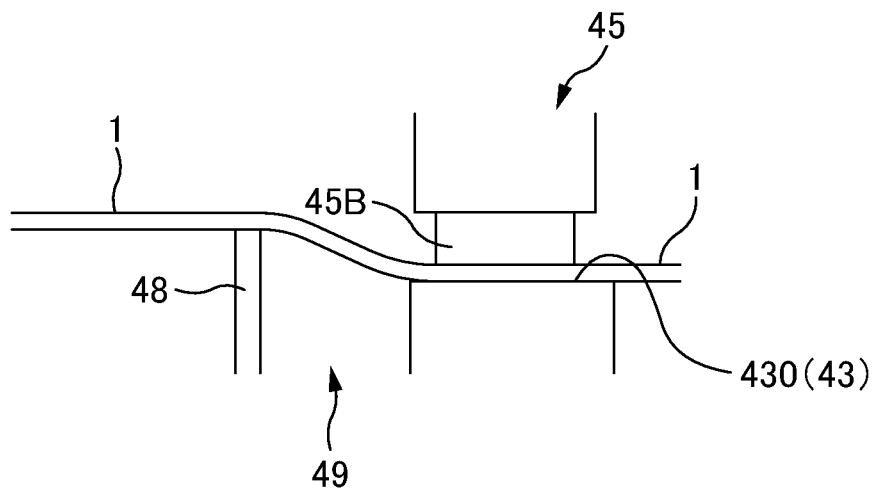
Figure 6C:
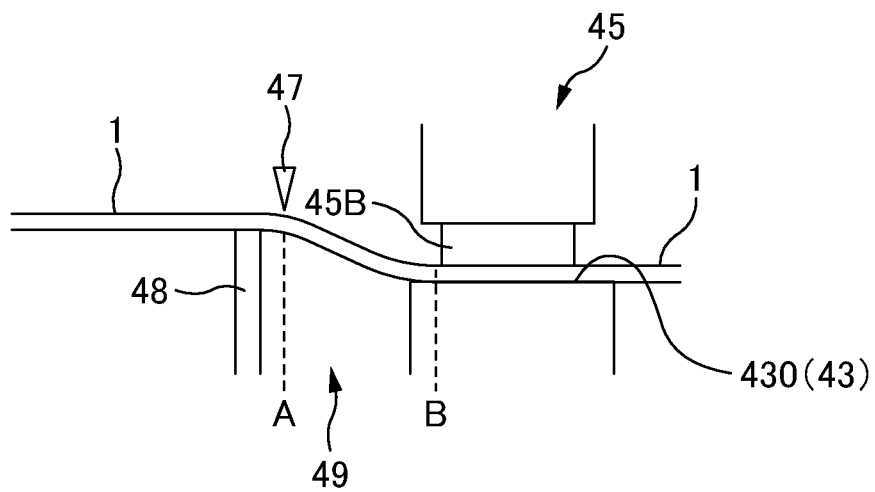

FIG. 5 is a perspective view of the vicinity of the bending part 48. FIGS. 6A to 6C are schematic explanatory diagrams of the vicinity of the bending part 48. FIG. 6A is a schematic explanatory diagram of a configuration in the vicinity of the bending part 48. FIG. 6B is a schematic explanatory diagram of the vicinity of the bending part 48 when the optical fiber 1 is gripped. FIG. 6C is an explanatory diagram of positional relationships between component elements in the vicinity of the bending part 48 and cutting positions.

The bending part 48 is a part that applies bending stress to the optical fiber 1. By forming an initial cut in the optical fiber 1 while applying bending stress to the optical fiber 1, a cut surface of the optical fiber 1 can be inclined (inclined with respect to a surface perpendicular to an optical axis of the optical fiber 1). The bending part 48 according to the present embodiment is formed as a support part that supports the optical fiber 1. The bending part 48 according to the present embodiment includes a recess 48A (notch part) having a V shape, and a bottom (top) of the recess 48A having a V shape is a part (bending part 48) that supports the optical fiber 1. Since the bending part 48 includes the recess 48A (notch part) having a V shape in the present embodiment, the optical fiber 1 is less likely to be detached from the bending part 48 (the bottom of the recess 48A having a V shape can maintain the optical fiber 1 in a supported state).

In the present embodiment, the bending part 48 is arranged closer to the rear side (side of the holder 3) than the placement surface 430 and the first guide part 431. In other words, the bending part 48 supports the optical fiber 1 on the rear side (side of the holder 3) with respect to the placement surface 430 and the first guide part 431. A gap 49 is formed between the bending part 48 and the first guide part 431. In the present embodiment, when the operation device 15 and the cut formation part 46 are rotated in the closing direction, the blade 47 is inserted into the gap 49 between the bending part 48 and the first guide part 431. In the present embodiment, the blade 47 forms an initial cut in the optical fiber 1 between the bending part 48 and the first guide part 431.

The bending part 48 (specifically, the bottom of the recess 48A having a V shape) supports the optical fiber 1 in the upper side than the placement surface 430. In other words, the bending part 48 is arranged to the upper side than the placement surface 430. In this way, as illustrated in FIG. 6B, when the optical fiber 1 is gripped by the gripping member 45 (clamp part 45B), the optical fiber 1 on the placement surface 430 closer to the bending part 48 is bent more to the upper side. The bending part 48 applies, to the optical fiber 1, bending stress in accordance with a positional relationship between the gripping member 45 (clamp part 45B) and the placement surface 430.

In the present embodiment, the bending part 48 is fixed to the moving body 41 and fixed with respect to the placement surface 430. Thus, a positional relationship between the bending part 48 and the placement surface 430 is constant regardless of an open/close operation of the cut formation part 46 (or the operation device 15). Since a positional relationship between the bending part 48 and the placement surface 430 is constant regardless of the open/close operation of the cut formation part 46, bending stress applied to the optical fiber 1 can also be maintained to be constant before and after the blade 47 forms an initial cut in the optical fiber 1. In other words, in the present embodiment, the bending part 48 can apply predetermined bending stress to the optical fiber 1 when the blade 47 forms an initial cut in the optical fiber 1. Note that, as in a second embodiment described later, the bending part 48 may be located so as to be movable with respect to the placement surface 430. However, when the bending part 48 is fixed with respect to the placement surface 430 as in the present embodiment, bending stress applied to the optical fiber 1 can be more easily maintained to be constant.

If bending stress applied to the optical fiber 1 is unstable during formation of an initial cut, a cut surface of the optical fiber 1 becomes difficult to incline at a predetermined angle. For example, if bending stress changes due to the open/close operation of the cut formation part 46, an inclination angle of a cut surface of the optical fiber 1 changes when a rotation amount of the cut formation part 46 until the blade 47 comes into contact with the optical fiber 1 changes due to wear of the blade 47. In contrast, in the present embodiment, when the blade 47 forms an initial cut in the optical fiber 1, predetermined bending stress (constant bending stress) can be applied to the optical fiber 1 regardless of the open/close operation of the cut formation part 46. Thus, in the present embodiment, even if the blade 47 wears out, bending stress applied to the optical fiber 1 during formation of an initial cut is constant, and thus a cut surface of the optical fiber 1 can be inclined at a predetermined angle.

Since a distance between the bending part 48 and the holder 3 is sufficiently longer than a distance (distance in the X-axis direction) between the bending part 48 and the gripping member 45 (clamp part 45B), the optical fiber 1 between the holder 3 and the bending part 48 is substantially parallel to the X-axis direction (strictly speaking, the optical fiber 1 closer to the bending part 48 slightly goes more upward). Thus, the optical fiber 1 is substantially parallel to the X-axis direction in a position of the bending part 48 (strictly speaking, the optical fiber 1 closer to the +X side slightly goes more upward). Meanwhile, the optical fiber 1 gripped by the gripping member 45 (clamp part 45B) is also parallel to the X-axis direction. However, the bending part 48 supports the optical fiber in the upper side than the placement surface 430, and thus there is a step between a support position in which the bending part 48 supports the optical fiber 1 and a support position (gripping position) in which the gripping member 45 supports the optical fiber 1. In other words, in the present embodiment, the optical fiber 1 is supported on different levels in a position of the bending part 48 and a position of the gripping member 45 (clamp part 45B). As a result, as illustrated in FIG. 6B, the optical fiber 1 is curved into an S shape between the bending part 48 and the gripping member 45 (clamp part 45B).

In the present embodiment, the bending part 48 is arranged to the upper side than the placement surface 430. Thus, as illustrated in FIG. 6B, when the optical fiber 1 is gripped between the clamp part 45B and the placement surface 430, the optical fiber 1 is curved upward on the rear side (side of the bending part 48) with respect to the clamp part 45B, and the optical fiber 1 is in a state of floating from the placement surface 430 at a rear edge of the placement surface 430. However, as already described, in the present embodiment, the first guide part 431 has a V shape open on the upper side, and thus the optical fiber 1 above the first guide part 431 is allowed to be displaced upward, and the optical fiber 1 is allowed to be in a state of floating from the placement surface 430.

As illustrated in FIG. 6C, a cut position (a position in which the blade 47 comes into contact with the optical fiber 1, a formation position of an initial cut) is set to a position closer to the bending part 48 than the gripping member 45 (clamp part 45B). In other words, a position of the blade 47 in the front-rear direction is set to a position closer to the bending part 48 than the gripping member 45 (clamp part 45B). Here, as illustrated in FIG. 6C, the cut position is expressed as a position A, and a position closer to the clamp part 45B is expressed as a position B.

FIG. 7A is an explanatory diagram of stress distribution of the optical fiber 1 in the position A. FIG. 7B is an explanatory diagram of stress distribution of the optical fiber 1 in the position B. A right arrow in the figures indicates that a tensile force is acting. A left arrow in the figures indicates that a compressive force is acting. A length of the arrows indicates magnitude of the forces.

As illustrated in FIG. 7A, in the position A (cut position), a tensile force acts on the inside of the optical fiber 1 on an opposite side of the bending part 48 (upper side), and a compressive force acts on the inside of the optical fiber 1 on the side of the bending part 48. As a result of such bending stress acting on the optical fiber 1, as illustrated in FIG. 6C, in the position A, bending stress is applied to the optical fiber 1 such that the upper side of the optical fiber 1 protrudes. Note that, in the position B, a compressive force acts on the inside of the optical fiber 1 on the opposite side (upper side) of the bending part 48 as illustrated in FIG. 7B, and the lower side of the optical fiber 1 protrudes as illustrated in FIG. 6C.

After the gripping member 45 grips the optical fiber 1, as already described, the operation device 15 is rotated in the closing direction, the latch release part 15C of the operation device 15 releases the latch state, and tension acts on the optical fiber 1 by a force of the tension application spring 60.

Figure 8A:
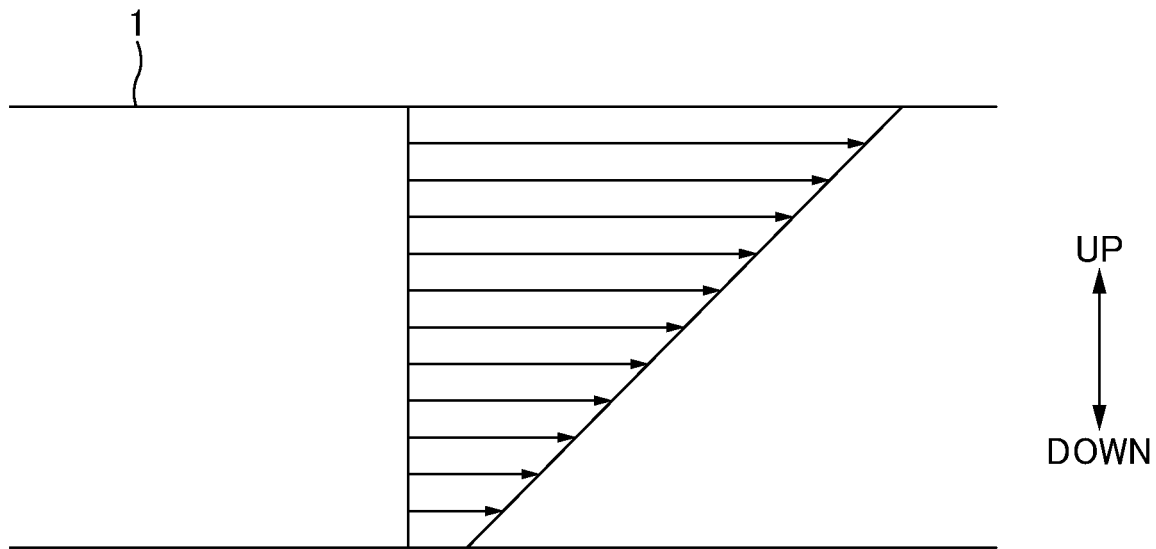
FIG. 8A is an explanatory diagram of stress distribution of the optical fiber 1 in the position A after a latch release.
Figure 8B:
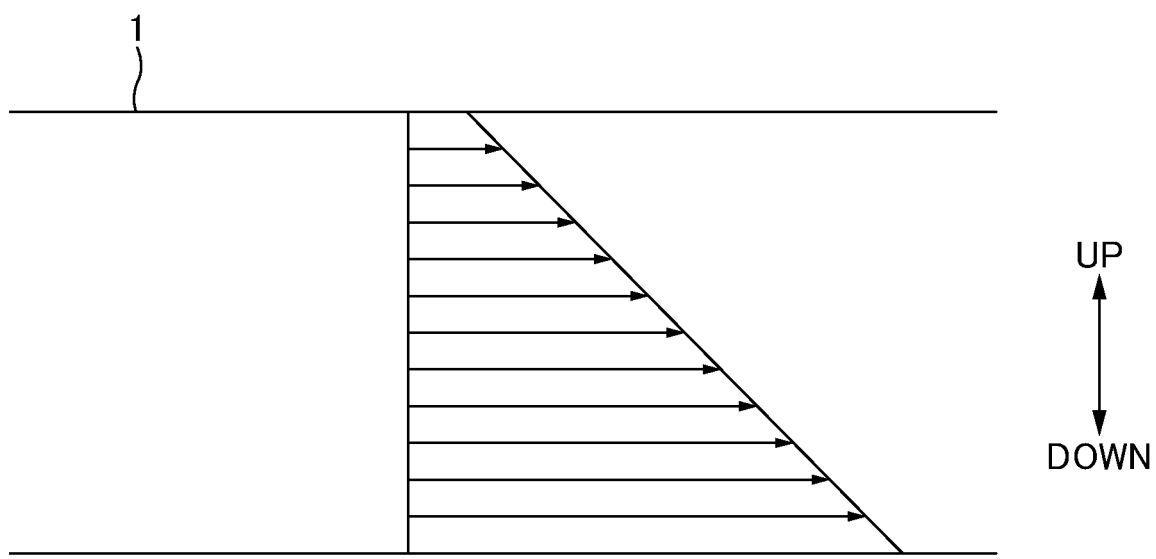
FIG. 8B is an explanatory diagram of stress distribution of the optical fiber 1 in the position B after the latch release.

FIG. 8A is an explanatory diagram of stress distribution of the optical fiber 1 in the position A after a latch release. FIG. 8B is an explanatory diagram of stress distribution of the optical fiber 1 in the position B after the latch release.

As illustrated in FIG. 8A, in the position A (cut position), a strong tensile force acts on the opposite side of the bending part 48 (upper side). The reason is that a tensile force by the tension application spring 60 is further superimposed on the tensile force (refer to FIG. 7A) applied by the bending part 48. Note that, as illustrated in FIG. 8B, a tensile force acting on the upper side of the optical fiber 1 is small in the position B. The reason is that a compressive force (refer to FIG. 8B) applied by the bending part 48 cancels out a tensile force by the tension application spring 60. When an initial cut is grown to cleave the optical fiber 1, an initial cut is formed in a section of the optical fiber 1 on which a strong tensile force acts. Note that, if an initial cut is formed in a section on which a sufficient tensile force does not act, a break or a ripple may occur in a cut surface.

In the present embodiment, the bending part 48 is located on the opposite side to the side on which the blade 47 forms an initial cut. Then, in the present embodiment, the bending part 48 applies a force to the optical fiber 1 from the opposite side to the side on which the blade 47 forms an initial cut. Specifically, in the present embodiment, the blade 47 forms an initial cut in the optical fiber 1 from above, and thus the bending part 48 is arranged below the optical fiber 1 and supports the lower side of the optical fiber 1. In this way, an initial cut can be formed in a section (the upper side of the optical fiber 1 illustrated in FIG. 8A) on which a strong tensile force acts, and thus a clean cut surface (mirror-finished cut surface) can be acquired.

In other words, in the present embodiment, the bending part 48 applies bending stress to the optical fiber 1 such that a section in which an initial cut is to be formed protrudes. Note that, in the present embodiment, a position of the blade 47 in the front-rear direction is set to a position closer to the bending part 48 than the gripping member 45 (clamp part 45B) such that a section in which an initial cut is to be formed protrudes. In this way, an initial cut can be formed in a section (the upper side of the optical fiber 1 illustrated in FIG. 8A) on which a strong tensile force acts, and thus a clean cut surface (mirror-finished cut surface) can be acquired.

Second Embodiment

In the first embodiment described above, the bending part 148 is fixed with respect to the placement surface 430. However, the bending part 148 may not be fixed with respect to the placement surface 430, and may be located so as to be movable with respect to the placement surface 430. In the first embodiment described above, the bending part 148 is arranged to the upper side than the placement surface 430, and applies a force to the optical fiber 1 from below. However, a direction in which the bending part 148 applies a force to the optical fiber 1 is not limited to this.

Figure 9A:
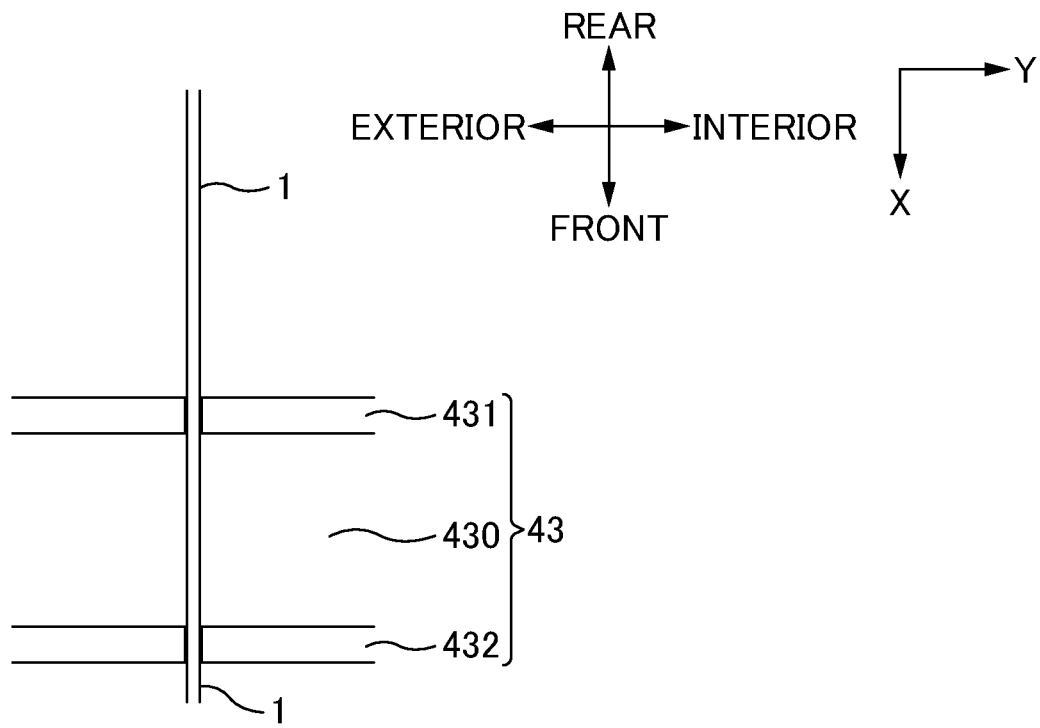
FIGS. 9A and 9B are schematic explanatory diagrams of the vicinity of a bending part 48 according to a second embodiment.
Figure 9B:
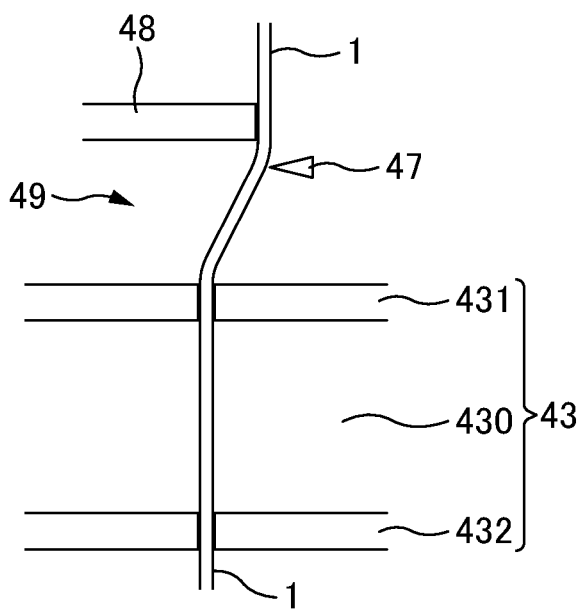
Figure 10A:
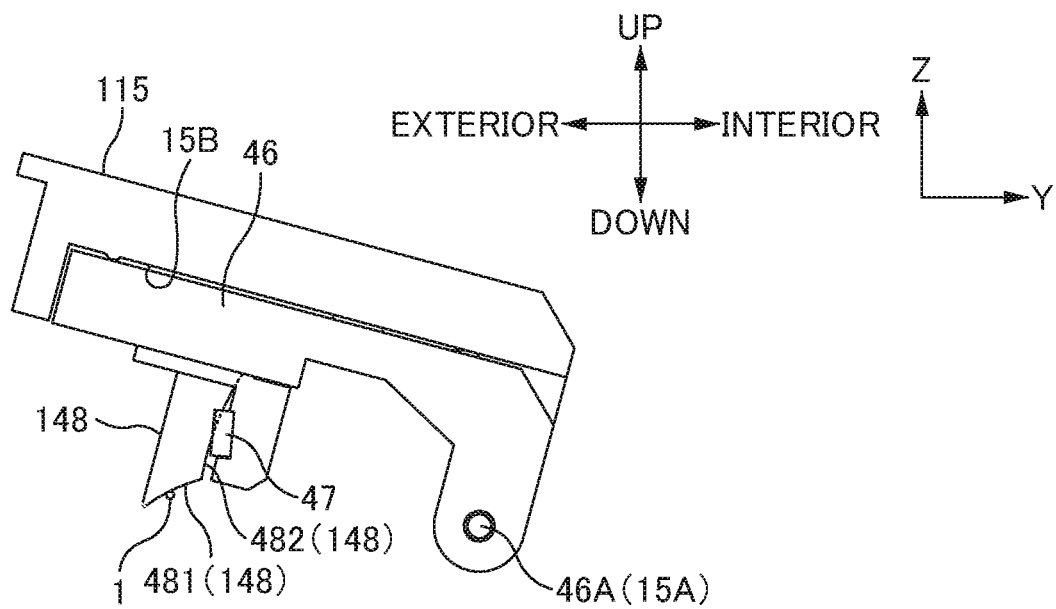
FIGS. 10A and 10B are diagrams when a cut formation part 46 (and an operation device 15) according to the second embodiment is viewed from a front side.
Figure 10B:
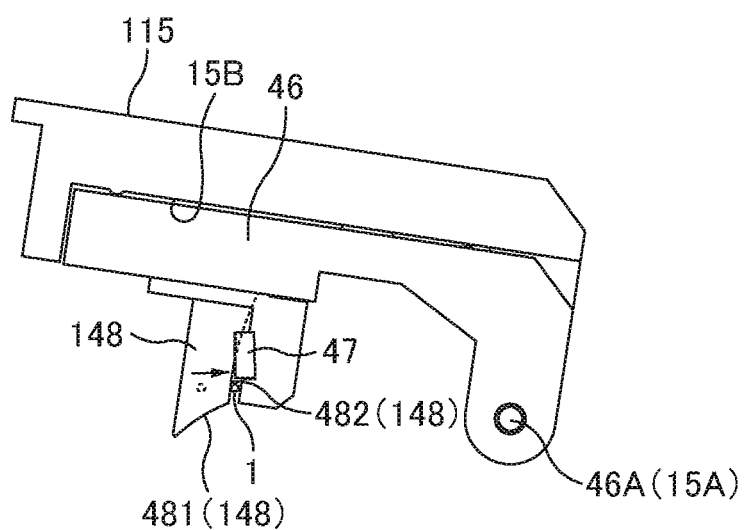

FIGS. 9A and 9B are schematic explanatory diagrams of the vicinity of a bending part 148 according to a second embodiment. FIG. 9A is a top view before bending stress is applied to an optical fiber 1. FIG. 9B is a top view when bending stress is applied to the optical fiber 1. FIGS. 10A and 10B are diagrams when a cut formation part 46 (and an operation device 115) according to the second embodiment is viewed from the front side.

In the second embodiment, the bending part 148 is located on the cut formation part 46. Thus, when the operation device 115 is rotated in a closing direction, the cut formation part 46 also rotates in the closing direction, and the bending part 148 moves in a direction closer to and comes into contact with the optical fiber 1. In this way, the bending part 148 according to the second embodiment is located so as to be movable with respect to a placement surface 430.

When the bending part 148 comes into contact with the optical fiber 1, the bending part 148 applies a force to the optical fiber 1 from the exterior side toward the interior side. In the second embodiment, when the bending part 148 comes into contact with the optical fiber 1, the optical fiber 1 is displaced toward the interior side by the bending part 148. Meanwhile, the optical fiber 1 on the placement surface 430 (the optical fiber 1 gripped by a clamp part 45B (not illustrated)) is fixed onto the placement surface 430 in a predetermined position in the Y-axis direction. As a result, as illustrated in FIG. 9B, the optical fiber 1 is curved into an S shape between the bending part 148 and a first guide part 431. In this way, the bending part 148 according to the second embodiment applies bending stress to the optical fiber 1.

As illustrated in FIG. 10A, the bending part 148 includes a first curved part 481 and a second curved part 482.

The first curved part 481 is a part that displaces the optical fiber 1 toward the interior side. The first curved part 481 is a part located below the second curved part 482, and is a part that comes into contact with the optical fiber 1 before the second curved part 482. The first curved part 481 is formed of a curved surface having a shorter distance to a rotary part 46A (rotation shaft) as the curved surface is closer to the upper side (side closer to the second curved part 482). In this way, when the cut formation part 46 rotates in the closing direction with the optical fiber 1 in contact with the first curved part 481, the optical fiber 1 is displaced toward the interior side (side of a blade 47).

The second curved part 482 is a part that applies predetermined bending stress to the optical fiber 1 regardless of an open/close operation of the cut formation part 46. The second curved part 482 is located to an upper side of the first curved part 481. When the cut formation part 46 rotates in the closing direction with the optical fiber 1 in contact with the first curved part 481, the optical fiber 1 comes into contact with the second curved part 482. The second curved part 482 is formed in a circular arc shape with the rotary part 46A (rotation shaft) as the center when viewed from the front side. In other words, a curved surface constituting the second curved part 482 has an equal distance to the rotary part 46A (rotation shaft). Thus, even when the cut formation part 46 rotates in the closing direction with the optical fiber 1 in contact with the second curved part 482, the optical fiber 1 is not displaced. Even when the cut formation part 46 rotates in the closing direction with the optical fiber 1 in contact with the second curved part 482, bending stress applied to the optical fiber 1 does not change. In other words, with the optical fiber 1 in contact with the second curved part 482, even when the cut formation part 46 rotates, bending stress applied to the optical fiber 1 is stable.

In the second embodiment, while the second curved part 482 of the bending part 148 applies bending stress to the optical fiber 1, the blade 47 forms an initial cut in the optical fiber 1 (refer to FIG. 10B). Also in the second embodiment, predetermined bending stress can be applied to the optical fiber 1 when the blade 47 forms an initial cut in the optical fiber 1. Thus, also in the second embodiment, bending stress applied to the optical fiber 1 during formation of an initial cut is constant, and thus a cut surface of the optical fiber 1 can be inclined at a predetermined angle.

In the second embodiment, the blade 47 is located on the cut formation part 46 so as to form an initial cut in the optical fiber 1 on the interior side (refer to FIGS. 9B and 10B). Then, also in the second embodiment, the bending part 148 is located on an opposite side to the side on which the blade 47 forms an initial cut. Also in the second embodiment, the bending part 148 applies bending stress to the optical fiber 1 such that a section in which an initial cut is to be formed protrudes. In this way, an initial cut can be formed in a section on which a strong tensile force acts, and thus a clean cut surface (mirror-finished cut surface) can be acquired.

Other Points

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

REFERENCE SIGNS LIST

1: Optical fiber;
3: Holder;
5: Waste case;
10: Base member;
11: Holder placement part;
13: Guide;
15: Operation device;
15A: Rotary part;
15B: Housing part;
15C: Latch release part;
40: Moving member;
41: Moving body;
42: Case housing part;
43: Placement region;
430: Placement surface;
431: First guide part;
432: Second guide part;
44: Engagement hole;
45: Gripping member;
45A: Rotary part;
45B: Clamp part;
45C: locking part;
46: Cut formation part;
46A: Rotary part;
47: Blade;
48: Bending part;
48A: Recess;
481: First curved part;
482: Second curved part;
49: Gap;
50: Latch;
51: Base-side latch part;
54: Moving-side latch part;
60: Tension application spring;
100: Fiber cutter.

The invention claimed is:

1. A fiber cutter comprising:
a base member configured to hold an optical fiber;
a moving member that is movable with respect to the base member in a front-rear direction of the base member, wherein the optical fiber held by the base member extends along the front-rear direction;
a placement surface on which an end part of the optical fiber is placed;
a gripping tool that grips the end part of the optical fiber;
a blade that forms an initial cut in the optical fiber gripped by the gripping tool; and
a support plate that applies a predetermined bending stress to the optical fiber when the blade forms the initial cut in the optical fiber, wherein
the placement surface, the gripping tool, and the support plate are located on the moving member,
the blade is configured to be inserted into a gap between the support plate and the placement surface to form the initial cut in the optical fiber, and
the support plate is attached to the placement surface and stands upright from the placement surface such that a positional relationship between the support plate and the placement surface is constant with respect to an up-down direction perpendicular to the front-rear direction.

2. The fiber cutter according to claim 1, wherein
the support plate applies the predetermined bending stress to the optical fiber to form a protruded section of the optical fiber, and
the blade forms the initial cut at the protruded section.

3. The fiber cutter according to claim 1, wherein
the gripping tool includes a clamp that presses the end part of the optical fiber against the placement surface of the fiber cutter on which the end part of the optical fiber is placed, and
the support plate supports the optical fiber at a higher position than the placement surface.

4. The fiber cutter according to claim 3, wherein
the support plate includes a V-shaped recess, and
a bottom of the V-shaped recess supports the optical fiber.

5. The fiber cutter according to claim 1, wherein
the support plate applies a force to the optical fiber from one side to an opposite side on which the blade forms the initial cut.

6. A fiber cutting method comprising:
gripping, with a gripping tool, an end part of an optical fiber placed on a placement surface while applying, with a support plate, a predetermined bending stress to the optical fiber, where the placement surface, the gripping tool, and the support plate are located on a moving member that is movable with respect to a base member in a front-rear direction of the base member, wherein the optical fiber held by the base member extends along the front-rear direction; and
cutting the optical fiber by forming an initial cut, with a blade, in the optical fiber gripped by the gripping tool while applying the predetermined bending stress to the optical fiber, wherein
forming the initial cut in the optical fiber comprises inserting the blade into a gap between the support plate and the placement surface, and
the support plate is attached to the placement surface to stand upright from the placement surface such that a positional relationship between the support plate and the placement surface is constant with respect to an up-down direction perpendicular to the front-rear direction.

* * * * *